United States Patent [19]
Torok et al.

[11] 3,709,709
[45] Jan. 9, 1973

[54] KAOLIN DERIVED PIGMENTS AND METHODS OF PRODUCING THE SAME
[75] Inventors: Andrew Torok; Thomas F. Walsh, both of Parsippany, N.J.
[73] Assignee: Georgia Kaolin Company
[22] Filed: Oct. 28, 1970
[21] Appl. No.: 84,895

[52] U.S. Cl. ............ 106/288 B, 106/309, 106/308 N, 106/72
[51] Int. Cl. .............................................. C08h 17/06
[58] Field of Search ........ 106/288 B, 308 N, 309, 72; 23/110 P

[56] References Cited
UNITED STATES PATENTS
2,375,977   5/1945   Davies et al. ............................ 23/143
3,414,422   12/1968  Iannicelli et al. ...................... 106/288

FOREIGN PATENTS OR APPLICATIONS
279,694   11/1927   Great Britain ..................... 23/110 P Primary Examiner—Delbert E. Gantz
Assistant Examiner—J. V. Howard
Attorney—Buell, Blenko & Ziesenheim

[57] ABSTRACT

Novel white pigments are produced through controlled extraction of alumina from kaolin by means of an ammonium sulfate or bisulfate leaching process, removal by water of the ammonium aluminum sulfate formed and recovering the insoluble residue. Other novel pigments are produced by subjecting the recovered insoluble residue to calcination in temperature range of 500°–1,100° C. The pigments produced according to the invention have a lower specific gravity than kaolin and/or calcined kaolin and exhibit a greatly improved brightness and whiteness.

7 Claims, No Drawings

KAOLIN DERIVED PIGMENTS AND METHODS OF PRODUCING THE SAME

This invention relates to kaolin derived pigments and to methods for producing the same and particularly to a novel white pigment derived by extraction from kaolin and if desired by subsequent calcination of the resultant pigment.

Kaolin has long been used as a pigment material for a variety of industrial purposes. For example kaolin has been used as pigment in paper coatings, paints, rubber, plastics and like materials. Natural kaolins, particularly from secondary deposits such as are formed in many places in the United States, are generally slightly off white and are less satisfactory for some pigmentation purposes than other white pigments. Many methods of improving whiteness have been proposed. For example clays are chemically bleached, extruded, milled and treated in various ways in order to improve their whiteness.

We provide a novel process for the production of a white kaolin derived pigment of greater whiteness than the natural kaolin from which it is derived. Preferably our process for producing these pigments consists of blending, either wet or dry, kaolin with ammonium sulfate or bisulfate, subjecting this mixture to roasting at temperature range of 200° C. to 550° C. for a period of time sufficient to bring about complete reaction of the ammonium sulfate-bisulfate with the kaolin. The roasted mixture is thereafter slurried into hot water and the water soluble ammonium aluminum sulfate produced by the roasting reaction is dissolved out. The insoluble residue is recovered by filtration or other means of solids recovery, dried and pulverized.

We have discovered that by controlling the ratio of ammonium sulfate or bisulfate to kaolin, pigments of varying specific gravity, brightness, and surface area can be produced.

The brightness and whiteness of the pigment produced by our invention is an outstanding feature. The brightness of the pigment produced is superior to other leaching techniques such as acid leaching, commonly employed for removing alumina from kaolin.

Another outstanding feature of our invention is that we can employ natural or partially and fully calcined kaolin as the raw material. Acid leaching demands use of partially calcined kaolins which results in a degraded kaolin residue of poor brightness and whiteness. Natural or fully calcined kaolins can only be acid leached under extreme pressure conditions.

Further novel pigments may be produced by subjecting the residues obtained from the ammonium sulfate or ammonium bisulfate leaching to calcination at temperature range of 550°–700°C. or 700° to 1,100° C. Range. This further treatment results in pigments with even greater brightness and whiteness than initially obtained from the ammonium sulfate or bisulfate leaching step.

The chemistry involved in our invention may be illustrated as follows:

1. Ammonium Sulfate Extraction of Kaolin
    Step 1 - $(NH_4)_2SO_4 \xrightarrow{140°C.} NH_4HSO_4 + NH_3$
    Step 2 - $4(NH_4)HSO_4 + Al_2O_3 (Kaolin) \xrightarrow{200°--550°C.} 2NH_4Al(SO_4)_2 + 2NH_3 + 3H_2O$
    Step 1 takes place in presence or absence of kaolin.
2. Ammonium Bisulfate Extraction of Kaolin
    $4(NH_4)HSO_4 + Al_2O_3 (Kaolin) \xrightarrow{200°--500°C.} 2NH_4Al(SO_4)_2 + 2NH_3 + 3H_2O$ More specifically, we blend 0.05 to 3.0 parts of ammonium sulfate or bisulfate to 1 part of kaolin clay. The blending technique employed may be a dry mixing operation or wet blending using slurry and salt solutions.

The preferred ratio is (0.5 – 3.0) parts of ammonium sulfate or bisulfate to 1 part of kaolin. More specifically, we prefer (1.5 to 2) parts of ammonium sulfate to 1 part of kaolin.

Employing more than 3 parts of ammonium sulfate or bisulfate to 1 part of kaolin will produce a desirable product, however, an excess of ammonium sulfate or bisulfate is used and is economically wasteful since no further $Al_2O_3$ is available from the amount of kaolin used.

The mixture is fed to a kiln and it is roasted at a temperature range of 200° to 550° C. Sufficient time is required at specified temperature to allow complete reaction between the ammonium sulfate and kaolin. The time required for completion of reaction at temperature is 30 minutes to 2 hours, depending mostly upon the kiln and thickness of reactant bed. However, completion of reaction is better judged by cessetion of ammonia evolution as illustrated in the diagram of chemical reaction.

The heat reacted mixture is slurried in hot water and the dissolved ammonium aluminum sulfate is removed by filtration or other solids-liquid separation technique. The insoluble residue is reslurried in hot water and again filtered. The process of rinsing is continued until substantially all of the soluble salts are removed from the insoluble residue.

The insoluble residue is dried and pulverized to a powder. In this form, the residue is a product of this invention.

Further processing of the residue is possible to produce other novel pigments. The dried, pulverized residue products obtained from the leaching process may be further calcined at 550°–700° C. Another series of novel pigments can be prepared by calcining the leaching process residue at 700°–1,050° C.

Alumina has been extracted from kaolin and other clay materials by using ammonium sulfate or bisulfate in a different series of steps for the recovery of the alumina. For example Davies U.S. Pat. No. 2,375,977 issued May 15, 1945 describes a process in which a clay is roasted with ammonium sulfate at 350° to 550° C. and then extracted in hot ammonium sulfate solution. The hot solute is then carried through a series of steps to recover the alumina contained therein and the residue is discarded. This is precisely contrary to our process in which the residue after hot water extraction is recovered as the product.

This invention can perhaps be best understood by reference to the following examples which show the processes involved and the various novel pigments produced according to our invention.

EXAMPLE 1

500 grams of kaolin were dry blended with 250 grams of ammonium sulfate, technical. This mixture was roasted at 460° C. for sufficient period to produce complete reaction as evidenced by the cessetion of ammonia evolution (approximately 2 hours).

The roasted mix was slurried into 10 liters of water and heated to 80° C. while constantly agitating. When a smooth slurry was obtained and crystals of ammonium aluminum sulfate were no longer visible, the slurry was filtered. The residue was thus treated until the final filtrate was substantially completely free of soluble aluminum salts.

The recovered residue was dried and pulverized. This novel pigment had the following important physical properties:

| | |
|---|---|
| Specific Gravity: | 2.42 |
| G. E. Brightness, %MgO: | 87.0 |
| Whiteness Index: | 10.2 |

EXAMPLE 2

500 grams of kaolin were dry blended with 500 grams of ammonium sulfate, technical. Further treated as outlined in Example 1.

The so produced novel pigment had the following important physical properties:

| | |
|---|---|
| Specific Gravity: | 2.38 |
| G. E. Brightness, % MgO: | 89.5 |
| Whiteness Index: | 9.3 |

EXAMPLE 3

500 grams of kaolin were dry blended with 750 grams of ammonium sulfate, technical. Further treated as outlined in Example 1.

The so produced novel pigment had the following important physical properties:

| | |
|---|---|
| Specific Gravity: | 2.33 |
| G. E. Brightness, % MgO: | 91.3 |
| Whiteness Index: | 8.5 |

EXAMPLE 4

500 grams of kaolin were dry blended with 1000 grams of ammonium sulfate, technical. Further treated as outlined in Example 1.

The so produced novel pigment had the following important physical properties:

| | |
|---|---|
| Specific Gravity: | 2.17 |
| G. E. Brightness, % MgO: | 93.0 |
| Whiteness Index: | 5.4 |

EXAMPLE 5

500 grams of kaolin were dry blended with 1500 grams of ammonium sulfate, technical. Further treated as outlined in Example 1.

The so produced novel pigment had the following important physical properties:

| | |
|---|---|
| Specific Gravity: | 2.14 |
| G. E. Brightness, % MgO: | 93.7 |
| Whiteness Index: | 5.2 |

Table I summarizes the properties of Examples 1 through 5 and also shows comparison to unreacted kaolin properties.

TABLE I

| | Specific Gravity | G.E. Brightness % MgO | W.I. |
|---|---|---|---|
| Kaolin, untreated | 2.65 | 85.2 | 15.2 |
| Ex. No. 1 Pigment | 2.42 | 87.0 | 10.2 |
| Ex. No. 2 Pigment | 2.38 | 89.5 | 9.3 |
| Ex. No. 3 Pigment | 2.33 | 91.3 | 8.5 |
| Ex. No. 4 Pigment | 2.17 | 93.0 | 5.4 |
| Ex. No. 5 Pigment | 2.14 | 93.7 | 5.2 |

EXAMPLE 6

Pigment products from Example 1 through 4 were calcined at 1,050° C. Table II summarizes properties of each novel pigment thus produced.

TABLE II

| | Specific Gravity | G.E. Brightness % MgO | W.I. |
|---|---|---|---|
| Example 1 Pigment, 1,050° C. Calcined | 2.45 | 94.2 | 9.4 |
| Example 2 Pigment, 1,050° C. Calcined | 2.39 | 95.8 | 7.7 |
| Example 3 Pigment, 1,050° C. Calcined | 2.35 | 96.8 | 5.4 |
| Example 4 Pigment, 1,050° C. Calcined | 2.26 | 98.4 | 1.5 |

The two important properties of pigments according to this example are low specific gravity and high brightness. Commercially available calcined kaolin pigment has a specific gravity of 2.69 and a G. E. Brightness of 91–92 with W. I. of 14–15.

EXAMPLE 7

Kaolin was calcined at 550° C. to form metakaolin. 500 grams of 550° C. calcined kaolin were dry blended with 1,000 grams of ammonium sulfate, technical. Roasting and leaching procedures as outlined in Example 1 were performed.

Properties of the novel pigment product were as follows:

| | |
|---|---|
| Specific Gravity: | 2.17 |
| G. E. Brightness, % MgO: | 93.6 |
| Whiteness Index: | 5.4 |

EXAMPLE 8

Kaolin was calcined at 1,050° C. to form completely calcined or dehydrated kaolin. 500 grams of the 1,050° calcined kaolin was blended with 1,000 grams of ammonium sulfate, technical. Roasting and leaching procedures as outlined in Example 1 were performed.

The resulting pigment product had the following physical properties:

| | |
|---|---|
| Specific Gravity: | 2.26 |
| G. E. Brightness, % MgO: | 94.0 |
| Whiteness Index: | 9.6 |

The pigments prepared according to our invention have unique properties which make them desirable white pigments for application in paints, paper coatings, rubber, plastics, and wherever a high brightness, low specific gravity pigment is of value.

In the foregoing specification we have illustrated certain preferred practices and embodiments of our invention, however, it will be understood that this invention may be otherwise embodied within the scope of the following claims.

We claim:

1. A method of recovering a white pigment of high brightness from kaolin comprising the steps of
   a. blending 1 part of kaolin with about 0.05 to 3.0 parts by weight of at least one member selected from the group consisting of ammonium sulfate and ammonium bisulfate to form a physical mixture,
   b. roasting said mixture at 200° to 550° C. for a period of time sufficient to remove all evoluable ammonia,
   c. dissolving the water soluble constituents in water
   d. recovering the insoluble residue as the pigment product and
   e. calcining the recovered insoluble residue in the temperature range 500° to 1,100° C.

2. A method as claimed in claim 1 wherein the kaolin is blended with the said at least one member in the ratio of 1 part by weight kaolin to about 1.5 to 2 parts by weight of said at least one member.

3. A method as claimed in claim 1 wherein the recovered insoluble residue is calcined at about 550° to 700° C.

4. A method as claimed in claim 1 wherein the recovered insoluble residue is calcined at about 700° to 1,100° C.

5. A white pigment of high brightness comprising a kaolin residue having removed therefrom the water soluble reaction products of kaolin and at least one member selected from the group consisting of ammonium sulfate and ammonium bisulfate at a temperature between about 200° and 550° C., and having been calcined at the temperature range 500° to 1,100° C.

6. A white pigment as claimed in claim 5 which has been calcined at about 550° to 700° C.

7. A white pigment as claimed in claim 5 which has been calcined at about 700° to 1,100° C.

* * * * *